US007435121B2

(12) United States Patent
Huang et al.

(10) Patent No.: US 7,435,121 B2
(45) Date of Patent: Oct. 14, 2008

(54) INPUT MODULE AND APPARATUS USING THE SAME

(75) Inventors: Mao-Sung Huang, Taoyuan (TW); Chien-Tsung Chen, Taoyuan (TW)

(73) Assignee: Darfon Electronics Corporation, Taoyuan (TW)

( * ) Notice: Subject to any disclaimer, the term of this patent is extended or adjusted under 35 U.S.C. 154(b) by 469 days.

(21) Appl. No.: 11/206,780

(22) Filed: Aug. 19, 2005

(65) Prior Publication Data

US 2006/0039124 A1 Feb. 23, 2006

(30) Foreign Application Priority Data

Aug. 19, 2004 (TW) ............................ 93213238 U

(51) Int. Cl.
*H01R 11/22* (2006.01)

(52) U.S. Cl. .................................................... 439/248

(58) Field of Classification Search ................. 439/248, 439/247

See application file for complete search history.

(56) References Cited

U.S. PATENT DOCUMENTS 3,951,500 A * 4/1976 Anderson .................. 439/248
4,802,861 A * 2/1989 Gaston ...................... 439/247
5,067,908 A * 11/1991 Guth ........................ 439/248
5,167,520 A * 12/1992 Henry et al. ............... 439/266
5,397,244 A * 3/1995 Generoli et al. ............ 439/248
5,591,040 A * 1/1997 Dohan et al. ............... 439/248
6,322,382 B1 * 11/2001 Viallet ...................... 439/248

* cited by examiner

*Primary Examiner*—Gary F. Paumen
(74) *Attorney, Agent, or Firm*—Reed Smith LLP; Stanley P. Fisher, Esq.; Juan Carlos A. Marquez, Esq.

(57) ABSTRACT

An input module for use with an electronic device (for example, a PDA) is provided. The input module includes an adapter and an input device. The adapter includes an adjustment mechanism, and the input device includes a connection portion and a main body. When the input device is connected with the adapter, the adjustment mechanism allows the connection portion in a specific position and coupling with the electronic device electrically.

18 Claims, 6 Drawing Sheets

Y
2031
203
401
3012
2051
205
201
X
301
3011

103

103

INPUT MODULE AND APPARATUS USING THE SAME

FIELD OF THE INVENTION

This invention generally relates to an input module for inputting data to an electronic device. More particularly, the input module is suitable for use with various electronic devices by an adjustable mechanism thereof.

BACKGROUND OF THE INVENTION

In modern days, personal digital assistants (PDA) are more and more popular for their portability and convenience.

For portability and size concerns, a typical PDA only has simplified buttons for inputting data, or alternatively inputting data has to be carried out by directly touching a display or a touch pad thereof. Therefore, when a user wants to input complex information, another external input device is needed.

For different hardware specifications of different PDAs, users need different types of external input devices. If users don't want to waste their time preparing different input devices or manually modifying (in some cases, you can't even modify it at all) the same input device to various PDAs, they really need a new solution.

SUMMARY OF THE INVENTION

The present invention provides an input module for use with an electronic device. The input module includes an adapter and an input device. The adapter includes an adjustment mechanism, and the input device includes a connection portion and a main body. When the input device is connected with the adapter, the adjustment mechanism allows the connection portion to be in a specific position and to be coupled with the electronic device electrically. By aforementioned functions, the input module can be used with various electronic devices.

The present invention also provides an input module for use with different types of electronic devices. The input module includes a first adapter, a second adapter and an input device. Each adapter includes an adjustment mechanism, and the input device includes a connection portion and a main body. Users can choose different adapters for various electronic devices for perfectly assembling and convenience.

Other objects and advantages of the present invention will become apparent from the following descriptions, taken in connection with the accompanying drawings, wherein, by way of illustration and example, several embodiments of the present invention are disclosed.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

An input module for use with an electronic device is provided. The input module is suitable for use with various electronic devices, providing a more convenient solution with reduced cost for users.

Figure 1:
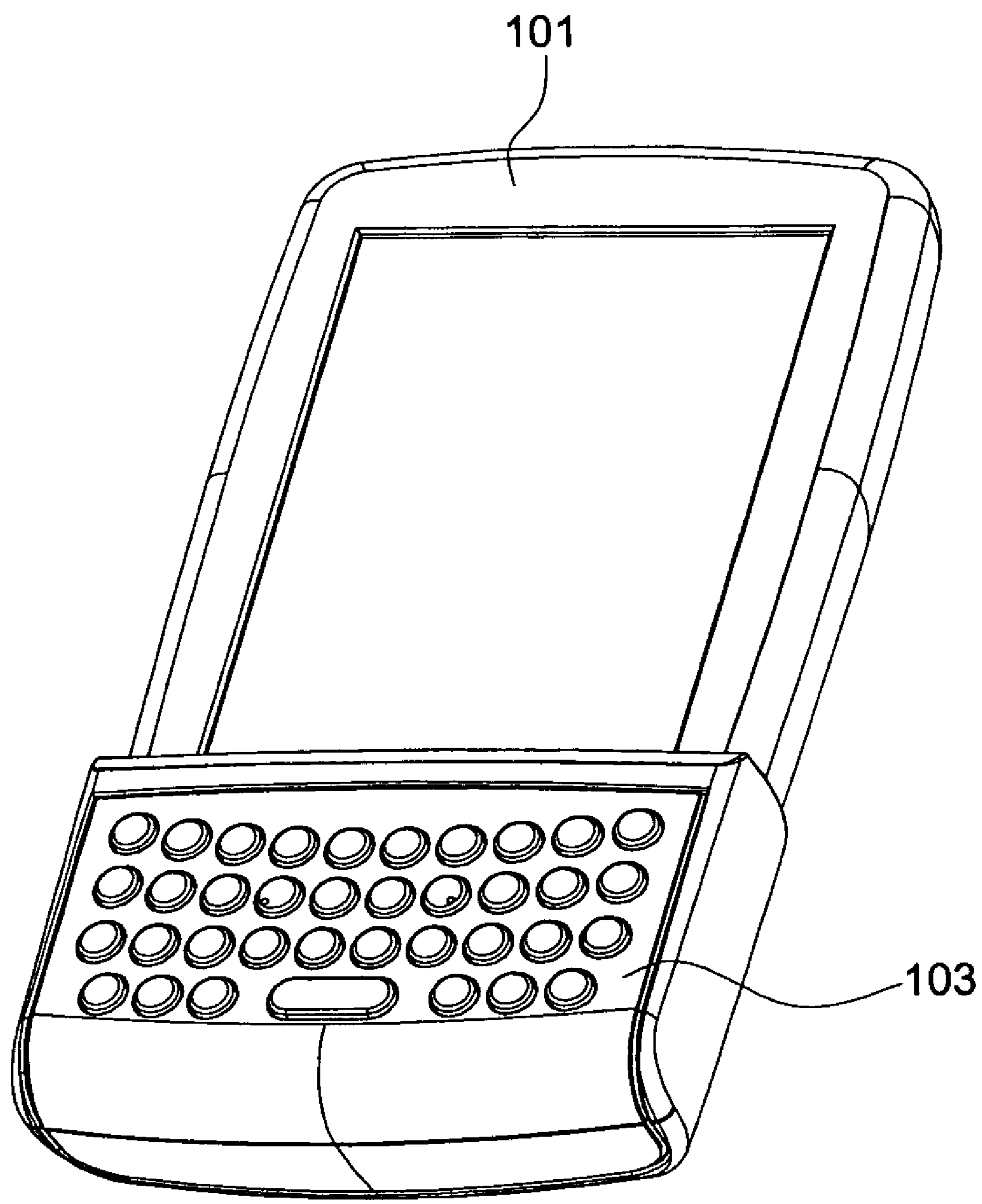
FIG. 1 is a schematic view illustrating one embodiment of the present invention.

Referring to FIG. 1, the electronic apparatus 100 includes an electronic device 101 and an input module 103. The electronic device 101 for example is a PDA. In other embodiment, the electronic device 101 could be any other electronic device that needs external input module 103. FIG. 1 depicts how the electronic device 101 is connected with the input module 103. Details regarding to the input module 103 will be described below. By combination of the input module 103 and the electronic device 101, a user can input data into various electronic devices through the input module 103.

Figure 2A:
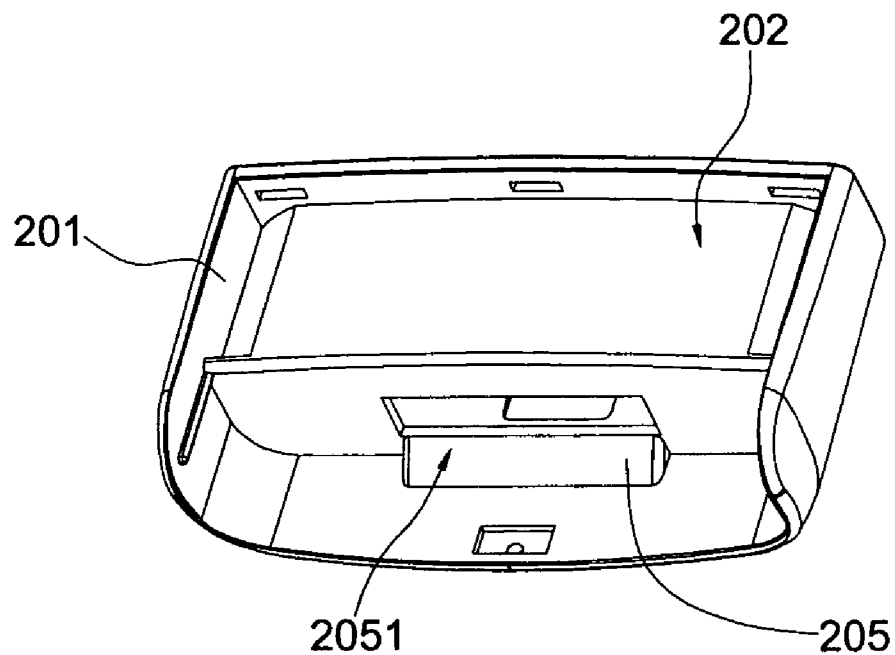
FIG. 2*a* is an explosive view illustrating one embodiment of the input module of the present invention.
Figure 2A:
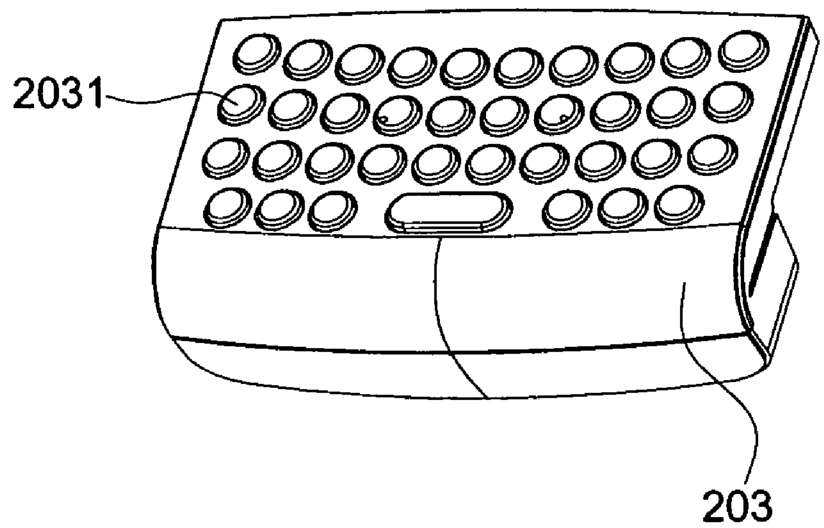

FIG. 2*a* is an explosive view illustrating one embodiment of the input module of the present invention. The input module 103 includes a first adapter 201 and an input device 203 (Please note that the purpose of using the word "first" in "the first adapter 201" is to distinguish it from the second adapter as described in another embodiment; the present invention only requires one adapter. The numbers used for naming elements of the present invention follows their introduction order in the claims appended herein.) The input device 203 is a keyboard, including a plurality of buttons 2031 thereon, for a user to input data into the electronic device (not shown in FIG. 2). The first adapter includes a first adjustment mechanism 205, which includes a second inclined plane 2051. The second inclined plane 2051 facilitates the first adapter 201 to engage with the input device 203 perfectly. The related details will be described as below. In other embodiments, the first adapter 201 defines a space 202. When the input module 103 couples with the electronic device, the space 202 accommodates part of the electronic device to improve the stability of the connection between the electronic device and the input module 103.

Figure 2B:
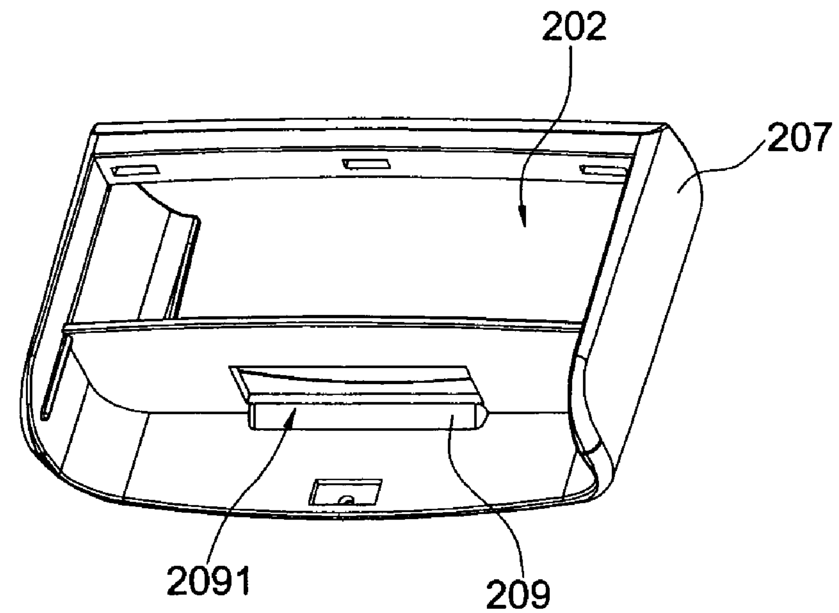
FIG. 2*b* is an explosive view illustrating another embodiment of the input module of the present invention.
Figure 2B:
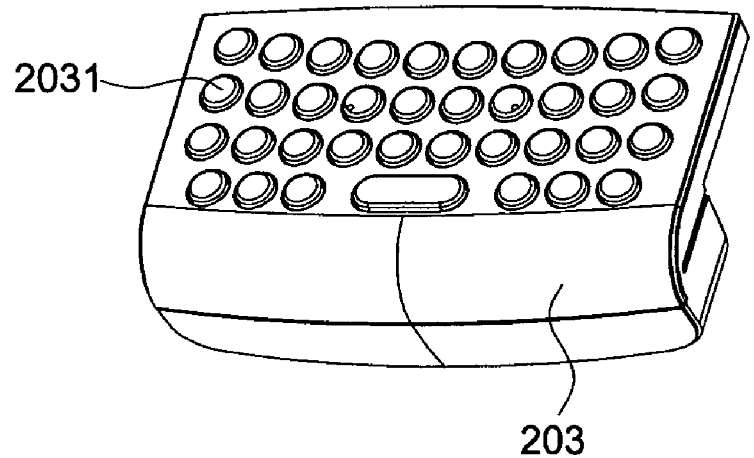

FIG. 2*b* is an explosive view illustrating another embodiment of the input module of the present invention. The input module 103 includes a second adapter 207 and an input device 203. The second adapter 207 includes a second adjustment device 209. The second adjustment mechanism 209 includes a third inclined plane 2091, helping combination between the second adapter 207 and the input device 203. Its details will be described in the following description. The second adapter 207 defines a first space 202. When the input module 201 couples with the electronic device, the space 202 accommodates parts of the electronic device to improve the stability of the connection between the electronic device and the input module 103.

There are structural and constructive differences between the embodiments of FIGS. 2*a* and 2*b*. For example, the slope of the third inclined plane 2091 is different from that of the second inclined plane 2051. The differences allow the input modules to be applied to various PDAs of different specifications. In other embodiments, an input device and a plurality of adapters, e.g. one input device 203 with two adapters 201 and 207, can be bundled as a single product to sell. Thus, a user can select an adapter to have the best connecting result. In other embodiments, the number of the adapters is not limited, but varies with types of PDAs that a user may utilize.

Figure 3:
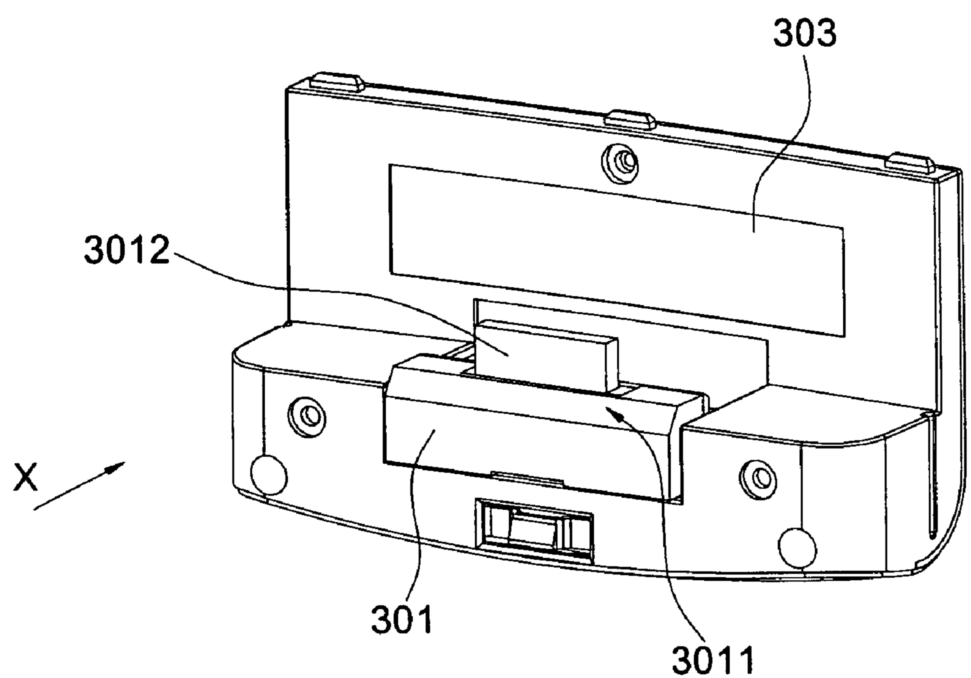
FIG. 3 is an upward view illustrating one embodiment of the input device of the present invention.

FIG. 3 is an upward view illustrating one embodiment of the input device of the present invention. The input device 203 includes a connection portion 301 and a main body 303. The connection portion 301 is connected with the corresponding part of an electronic device (not shown) for data transmission. The input device 203 includes a resilient component (not shown in FIG. 3, but shown in FIG. 4 depicted as the resilient component 401). The resilient component is disposed between the connection portion 301 and the main body 303, and selectively provides a resilient force to the connection portion 301. The connection portion 301 moves relative to the main body 303 along the X direction when a force is applied on it. The connection portion 301 includes a connector 3012 and a first inclined plane 3011. The first inclined plane 3011 facilitates the first adapter 201 (or the second adapter 207) to connect with the input device 203. The connector 3012 directly connects with the corresponding part of the electronic device.

Figure 4A:
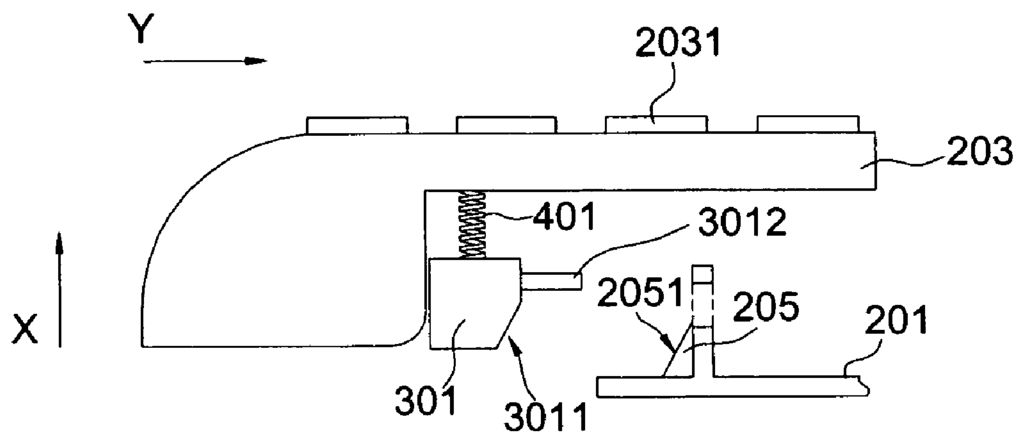
FIGS. 4*a* and 4*b* are schematic views depicting one embodiment of the input module of the present invention.
Figure 4B:
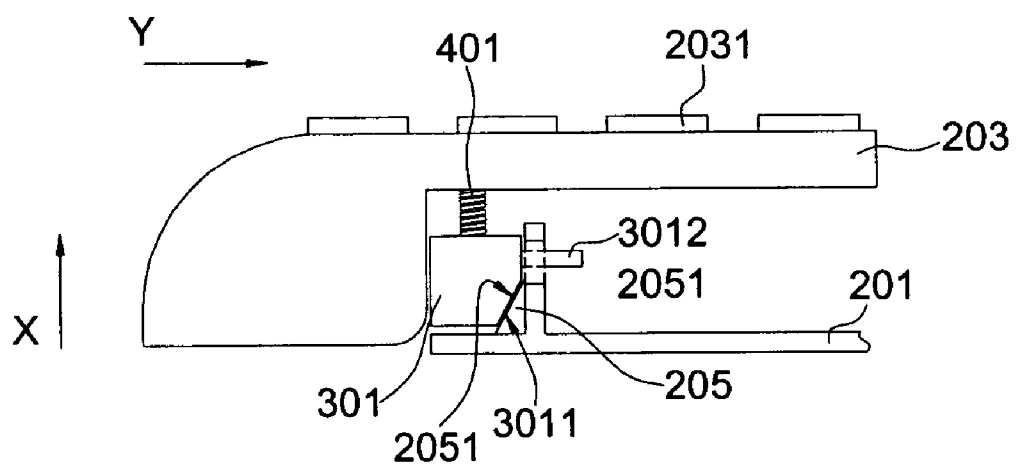

In the following it is described how the input module and the electronic device combine together, taking the embodiment as shown in FIG. 2*a* as an example. Referring to FIGS. 4*a* and 4*b*, when the input device 203 is connected with the first adapter 201 (the input device 203 moves along the Y direction), the first adjustment mechanism 205 allows the connection portion 301 at the first position (along the X direction) to couple with the electronic device electrically (through the connector 3012). During its movement to the first position of the connection portion 301, the second inclined 2051 of the first adjustment mechanism 205 contacts with the first inclined plane 3011 of the connection portion 301, to facilitate the connection portion 301 to reach the first position and contact with the electronic device. As shown the FIG. 4*b*, the connection portion 301 is at the first position.

Figure 5A:
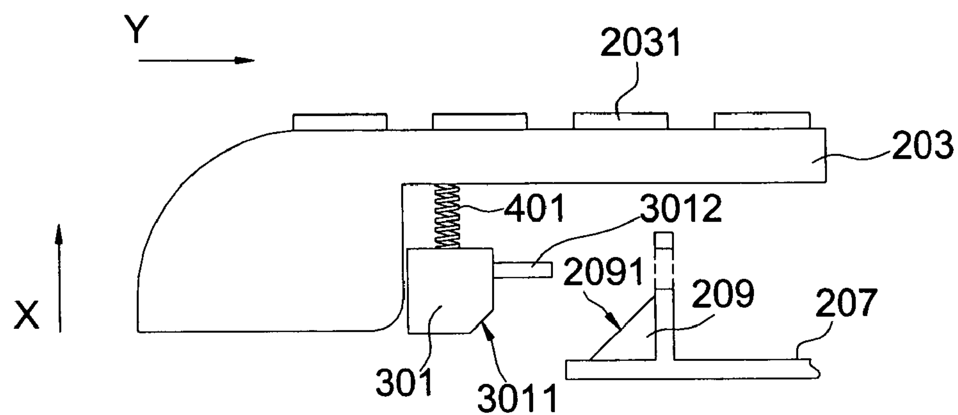
FIGS. 5*a* and 5*b* are schematic views depicting another embodiment of the input module of the present invention.
Figure 5B:
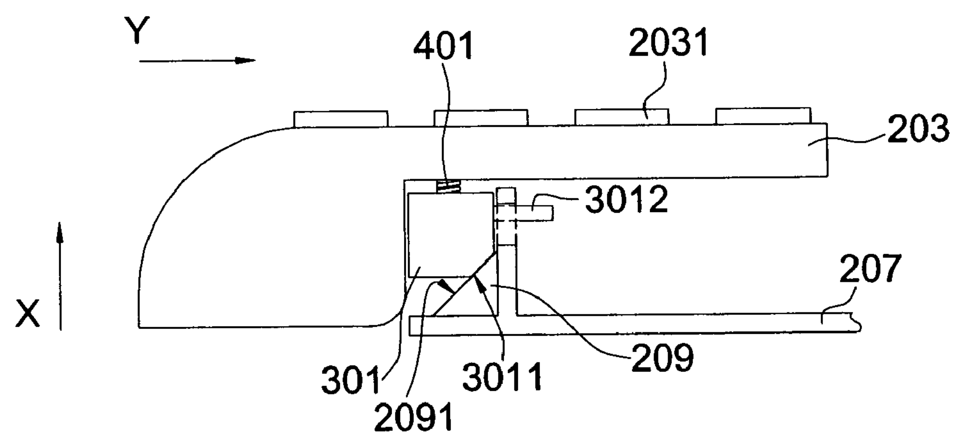

Similarly, taking the embodiment in FIG. 2*b* as an example, referring to FIGS. 5*a* and 5*b*, when the input device 203 is connected with the second adapter 207 (the input device 203 moves along the Y direction), the second adjustment mechanism 209 allows the connection portion 301 at the second position to couple with different types of the electronic device electrically (through the connector 3012). During its movement to the second position of the connection portion 301, the second inclined plane 2051 of the second adjustment mechanism 209 contacts with the first inclined plane 3011 of the connection portion 301, to facilitate the connection portion 301 to reach the second position and contact with the electronic device 101. As shown the FIG. 5*b*, the connection portion 301 is at the second position.

In other embodiments, the first adjustment mechanism 205 includes a protrusion, which has the similar functions of the second inclined plane 2051. In other embodiments, the second adjustment mechanism 209 also includes a protrusion, which has the similar functions of the third inclined plane 2091.

Detailed description of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriate system, structure or manner.

The invention claimed is:

1. An input module for use with an electronic device, comprising:

a first adapter having a first adjustment mechanism; and an input device having a connection portion, a main body, and a plurality of buttons for a user to input data to the electronic device, the connection portion being movable relatively to the main body, wherein, when the input device is connected with the first adapter, the first adjustment mechanism allows the connection portion to be at a first position to couple with the electronic device electrically.

2. The input module according to claim 1, wherein the connection portion includes a first inclined plane.

3. The input module according to claim 2, wherein the first adjustment mechanism includes a second inclined plane, and the first inclined plane contacts with the second inclined plane during the connection portion moving to the first position.

4. The input module according to claim 1, wherein the first adjustment mechanism includes a protrusion.

5. The input module according to claim 1, wherein the input device includes a resilient component connected with the connection portion, and the resilient component selectively provides a resilient force to the connection portion.

6. The input module according to claim 1, wherein the electronic device is a personal digital assistant (PDA).

7. The input module according to claim 1, wherein the first adapter defines a space; and when the input nodule couples with the electronic device electrically, the space accommodates part of the electronic device.

8. An input module for use with an electronic device, comprising:

a first adapter having a first adjustment mechanism;

a second adapter having a second adjustment mechanism; and an input device having a connection portion, a main body, and a plurality of buttons for a user to input data to the electronic device, the connection portion being movable relatively to the main body, wherein, when the input device is connected with the first adapter, the first adjustment mechanism allows the connection portion to be at a first position to couple with the electronic device electrically; and when the input device is connected with the second adapter, the second adjustment mechanism allows the connection portion to be at a second position to couple with the electronic device electrically.

9. The input module according to claim 8, wherein the connection portion includes a first inclined plane.

10. The input module according to claim 9, wherein the first adjustment mechanism includes a second inclined plane, and the first inclined plane contacts with the second inclined plane when the connection portion is moved to the first position.

11. The input module according to claim 9, wherein the second adjustment mechanism includes a third inclined plane, and the first inclined plane contacts with the third inclined plane when the connection portion is moved to the second position.

12. The input module according to claim 8, wherein the first adjustment mechanism includes a protrusion.

13. The input module according to claim 8, wherein the second adjustment mechanism includes a protrusion.

14. The input module according to claim 8, wherein the input device includes a resilient component connected with the connection portion, and the resilient component selectively provides a resilient force to the connection portion.

15. The input module according to claim 8, wherein the electronic device is a personal digital assistant (PDA).

16. The input module according to claim 8, wherein the first adapter defines a space; and when the input nodule couples with the electronic device electrically, the space accommodates part of the electronic device.

17. The input module according to claim 8, wherein the second adapter defines a space; and when the input nodule couples with the electronic device electrically, the space accommodates part of the electronic device.

18. An input module for use with a personal digital assistant (PDA), comprising:

a first adapter having a first adjustment mechanism; and an input device having a connection portion and a main body, the connection portion being movable relatively to the main body, wherein, when the input device is connected with the first adapter, the first adjustment mechanism allows the connection portion to be at a first position to couple with the personal digital assistant electrically.

* * * * *